United States Patent Office 3,415,819
Patented Dec. 10, 1968

3,415,819
PROCESS FOR 17α-(3'-HYDROXYPROPYL)-5-ANDROSTENE-3β,17β-DIOL AND THE DI-TETRAHYDROPYRANYL ETHER THEREOF
George Gal, Summit, and Meyer Sletzinger, North Plainfield, N.J., assignors to Merck & Co., Inc., Rahway, N.J., a corporation of New Jersey
No Drawing. Filed Apr. 21, 1966, Ser. No. 544,119
7 Claims. (Cl. 260—239.55)

This invention is generally concerned with the preparation of steroids which are intermediates for the preparation of 20 - spirox-4,6-dien-3-one[2',3'α-tetrahydrofuran-2' - spiro-17-(4,6-androstadien-3-one)] and 20-spirox-7α-acetylthio - 4,6 - dien - 3-one[(2',3'α-tetrahydrofuran-2'-spiro-17-(7α-acetylthio-4'androsten-3-one)] which possess useful therapeutic properties as aldosterone inhibitors. Aldosterone inhibitors block the salt-retaining effects of aldosterone and other salt-retaining steroids and thereby have utility in the treatment of diseases such as congestive heart failure, nephrosis, and cirrhosis of the kidney in which aldosterone secretion is increased. More particularly, this invention relates to a process for the preparation of 17α - (3 - hydroxypropyl)-5-androstene3β,17β-diol and the di-tetrahydropyranyl ether thereof.

The starting material for the process of this invention is dehydroepiandrosterone tetrahydropyranyl ether (Compound I). In the first step in the preparation of 17α-(3-hydroxypropyl) - 5 - androstene-3β,17β-diol (Compound IV), Compound I is reacted with 3-lithiopropanyl-1,2'-tetrahydropyranyl ether (Compound II), to provide 17α-(3' - hydroxypropyl)-5-androstene-3β,17β-diol di-tetrahydropyranyl ether (Compound III), and in the second step Compound III is hydrolyzed to split the tetrahydropyranyl ether linkages and provide Compound IV. The first step reaction is accomplished by adding a solution of Compound II in an inert organic solvent, preferably ether, to a solution of Compound I in an anhydrous organic solvent, preferably tetrahydrofuran, during which time the temperature of the reaction mixture is kept below 30° C. After addition is complete, the reaction mixture is allowed to stand at room temperature for about 15 hours. The reaction mixture is then added to water and the reaction product is removed by extraction with a suitable organic solvent, such as ether. The ether extract is washed with water, dried, and the solvent is removed by distillation under reduced pressure. The oily residue is 17α-(3'-hydroxypropyl) - 5 - androstene-3β,17β-diol di-tetrahydropyranyl ether (Compound III). Compound III is not purified but is converted to 17α - (3'-hydroxypropyl)-5-androstene-3β, 17β-diol (Compound IV) by allowing a solution thereof in a suitable organic solvent, such as a lower aliphatic alcohol, preferably ethanol, containing a catalytic amount of strong acid, preferably p-toluenesulfonic acid to stand at room temperature for several hours. Compound IV precipitates from the reaction mixture and is filtered off, washed with a suitable solvent, such as ethanol, and dried in vacuo.

The following examples illustrate methods of carrying out the present invention, but it is to be understood that these examples are given for purposes of illustration and not of limitation.

Example 1.—17α-(3'-hydroxypropyl)-5-androstene-3β,17β-diol 8.9 grams of 3-chloropropanol-1,2'-tetrahydropyranyl ether is added over a period of 2 hours to a slurry comprising 0.8 grams of finely divided lithium in 40 ml. of anhydrous ether. The temperature of the reaction mixture is kept under an argon atmosphere and maintained at −5° to −10° C. during the addition. The reaction mixture is filtered in an argon atmosphere to remove traces of unreacted lithium and lithium chloride. The clear filtrate is an ether solution of 3-lithiopropanol-1,2'-tetrahydropyranyl ether and is added to a solution of 10.5 grams of dehydroepiandrosterone tetrahydropyranyl ether in solution in 110 ml. of anhydrous tetrahydrofuran over a period of 30 minutes, during which time the temperature of the reaction mixture is kept below 30° C. The reaction mixture is allowed to stand for 15 hours at room temperature after addition is complete and is then cautiously added to 500 ml. of cold water. This mixture is extracted three times with ether and the combined ether extracts are washed with water and dried over anhydrous magnesium sulfate. The solvent is removed from the dried extracts by distillation under reduced pressure. The oily residue is 17α-(3' - hydroxypropyl)-5-androstene-3β,17β-diol di-tetrahydropyranyl ether.

EXAMPLE 2

The oily residue from Example 1 is dissolved in 100 ml. of ethanol and 0.7 gram of p-toluenesulfonic acid in solution in 10 ml. of ethanol are added to the solution of the oily residue and the resulting solution is stirred at room temperature for 5 hours. The precipitate which forms is removed by filtration, washed with ethanol, and dried in vacuo. 5.66 grams of 17α-(3'-hydroxypropyl)-5-androstene-3β,17β-diol are obtained, which has a melting point of 274°–278° C.

The 17α - (3'-hydroxypropyl)-5-androstene-3β,17β-diol is used as an intermediate in the preparation of 20-spirox-4,6-dien-3-one and 20-spirox-7α-acetylthio-4,6-dien-3-one by a process which comprises a first step of treating 17α-(3' - hydroxypropyl)-5-androstene-3β,17β-diol in solution in anhydrous pyridine with an acid chloride of an aromatic or aliphatic sulfonic acid, such as p-toluenesulfonic acid chloride, or methanesulfonic acid chloride, to provide 3β-mesyloxy-20-spirox-5-ene. In this reaction, the acid chloride is added dropwise to a solution of 17α-(3'-hydroxypropyl) - 5-androstene-3β,17β-diol in anhydrous pyridine over a period of from about 20 to 30 minutes, during which time the temperature of the reaction mixture is maintained at about −10° C. After addition is complete, the mixture is stirred fo about thre hours and during this time the temperature is kept below about 0° C. The reaction mixture is allowed to stand overnight at room temperature and then poured into ice cold water. The precipitate which forms is removed by extracting with a suitable solvent, such as ethyl acetate, and the extract is washed with cold dilute hydrochloric acid until all pyridine is removed. The solvent is removed by ditsillation under reduced pressure. The residue is crude 3β-mesyloxy-20-spirox-5-ene.

The crude 3β-mesyloxy-20-spirox-5-ene is converted to 3β-hydroxy-20-spirox-5-ene in a second step by forming a solution thereof in a solvent mixture consisting of acetone and water, refluxing the resulting solution for about 4 hours, and then removing the acetone by distillation under reduced pressure and replacing the acetone with an equal volume of water as it is removed. The resulting slurry is cooled to about 10° C., and the solvent material is removed by filtration, washed with water until acid free, and dried under reduced pressure. The dried material is 3β-hydroxy-20-spirox-5-ene and may be purified by suspension in normal-hexane, stirring the suspension at a temperature of about 60° C. for about 2 hours, cooling the suspension to room temperature, filtering, washing the solvent materials with normal-hexane, and drying the solid purified 3β-hydroxy-20-spirox-5-ene under reduced pressure.

The purified 3β-hydroxy-20-spirox-5-ene is converted in a third step to 3β-hydroxy-5,6-dibromo-20-spiroxane by bromination. Bromination is conveniently accomplished by adding a solution of bromine in methylenechloride to a solution of 3β-hydroxy-20-spirox-5-ene in the same solvent, the solution being cooled and kept under nitrogen during the addition. After addition is complete, the solution is allowed to stand for about 15 minutes at about 5° C. and then concentrated by removing the solvent under reduced pressure. The residual syrup is dissolved in acetone and upon cooling and allowing the acetone solution to stand, crystalline 3β-hydroxy-5,6-dibromo-20-spiroxane precipitates. The precipitate is removed by filtration, washed with cold water and dried in vacuo.

The 3β-hydroxy-5,6-dibromo-20-spiroxane is oxidized in a fourth step to provide 5,6-dibromo-20-spiroxane-3-one. Oxidation is conveniently accomplished by adding 8 N chromic acid in 40% sulfuric acid dropwise over a period of about 3 to 4 minutes to a solution of 3β-hydroxy-5,6-dibromo-20-spiroxane in acetone, which is kept under nitrogen and maintained at a temperature of about −5° C. during the addition. After addition is complete, the reaction mixture is stirred for about 30 minutes and then poured into 400 ml. of ice cold water. The solid which precipitates is removed by filtration and dissolved in a suitable solvent, such as methylenechloride. The resulting solution is washed with cold saturated aqueous sodium chloride solution, dried over anhydrous magnesium sulfate, and filtered. The solvent is removed by distillation under reduced presure. The residue is 5,6-dibromo-20-spiroxane-3-one. This substance is relatively unstable, and it is preferred that it be used promptly in the next reaction step.

5,6-dibromo-20-spiroxan-3-one is dehydrobrominated in the fifth step. Dehydrobromination is accomplished by reacting 5,6-dibromo-20-spiroxan-3-one with lithium carbonate, and lithium bromine in dimethylformamide suspension. The suspension of the reagents is added to a methylenechloride solution of 5,6-dibromo-20-spiroxan-3-one. The methylenechloride is removed by distillation under reduced pressure, and the residue is heated under nitrogen for about 20 hours at a temperature of from about 95° to 100° C. The reaction mixture is then cooled to room temperature and poured into ice cold water. The precipitated 20-spirox-4,6-dien-3-one is isolated by extraction of the reaction mixture with ether, drying the ether extract over magnesium sulfate, and removing the ether by distillation under reduced pressure. 20-spirox-4,6-dien-3-one may be readily converted to 20-spirox-7α-acetylthio-4,6-dien-one by reaction with thioacetic acid according to known procedures.

3β-Mesyloxy-20-spirox-5-ene 10.2 grams of mesylchloride are added dropwise over a period of 20 to 30 minutes to a slurry of 7.5 grams of 17α-(3′-hydroxypropyl)-5-androstene-3β,17β-diol in 75 ml. of anhydrous pyridine. The reaction mixture is kept at a temperature of −10° C. during the addition. After addition is complete, the mixture is stirred for 3 hours and during this period the temperature is kept between −10° C. and 0° C. The mixture is then allowed to come to room temperature and stand at room temperature overnight. After standing overnight, the reaction mixture is poured in 700 ml. of ice water, and the precipitate is removed by extraction with ethyl acetate. The extract is washed with 0.5 N hydrochloric acid until free from pyridine, dried over anhydrous magnesium sulfate, and filtered. The solvent is removed by distillation under reduced pressure. A residue of 8.9 grams of crude 3β-mesyloxy-20-spirox-5-ene is obtained, which has a melting point of 132° to 134° C.

3β-hydroxy-20-spirox-5-ene

The crude 3β-mesyloxy-20-spirox-5-ene is dissolved in a solvent mixture composed of 180 ml. of acetone and 40 ml. of water. The resulting solution is refluxed for 4 hours, and the acetone is then removed by distillation under reduced pressure and replaced simultaneously with water at a rate such that the volume in the distillation flask is maintained at a constant level. The resulting slurry is cooled to 10° C., and the solid material is removed by filtration, washed with water until acid free, and dried under reduced pressure. 7.1 grams of 3β-hydroxy-20-spirox-5-ene are obtained, which has a melting point of 165° to 172° C. The crude 3β-hydroxy-20-spirox-5-ene is suspended in 70 ml. of normal-hexane, and the suspension is stirred for 2 hours at a temperature of 60° C. The suspension is cooled to room temperature, filtered, and the solid material is washed with normal-hexane and dried under reduced pressure. 6.7 grams of 3β-hydroxy-20-spirox-5-ene are obtained, which has a melting point of 185° to 187° C.

3β-hydroxy-5,6-dibromo-20-spiroxane 9.9 grams of 3β-hydroxy-20-spirox-5-ene are dissolved in 220 ml. of methylenechloride. The solution is cooled to 5° C. under nitrogen and a solution of 4.8 grams of bromine and 25 ml. of methylenechloride is added over a period of 10 minutes. After addition is complete, the solution is allowed to stand at a temperature of 5° C. for 15 minutes and the solvents are then removed by distillation under reduced pressure. The residue is dissolved in 30 ml. of dry acetone and the acetone solution is cooled to 0° C. and allowed to stand at that temperature for 20 minutes.

3β-hydroxy-5,6-dibromo-20-spiroxane crystallizes from the acetone solution on standing and is removed by filtration, washed with cold acetone, and dried under reduced pressure. 12.5 grams of 3β-hydroxy-5,6-dibromo-20-spiroxane, having a melting point of 124° to 125° C., are obtained.

5,6-dibromo-20-spiroxan-3-one 4.9 grams of 3β-hydroxy-5,6-dibromo-20-spiroxane are dissolved in 350 ml. of acetone and the acetone solution cooled to −5° C. under nitrogen. 3.3 ml. of 8 N chromic acid in 40% sulfuric acid are added dropwise to the acetone solution over a period of 4 minutes. After addition is complete, the reaction mixture is stirred for 30 minutes and poured into 400 ml. of ice water. The solid which precipitates when the acetone solution is poured into ice water is removed by filtration, and the wet solid is dissolved in 70 ml. of methylenechloride. The methylenechloride solution is washed with cold saturated aqueous sodium chloride solution, dried over anhydrous magnesium sulfate, and filtered. The solution is concentrated to a volume of 40 ml. by distilling off the solvent under reduced pressure. The residual solution contains 5,6-dibromo-20-spiroxan-3-one in solution.

20-spirox-4,6-dien-3-one 3.1 grams of lithium carbonate, 2.7 grams of lithium bromide and 30 ml. of dimethylformamide are added to the methylenechloride solution of 5,6-dibromo-20-spiroxan-3-one obtained as above. The methylenechloride is removed from the reaction mixture by distillation under reduced pressure and the residual solution is heated under nitrogen for 20 hours at a temperature of 95° to 100° C. After the heating period, the reaction mixture is cooled to room temperature and poured into 300 ml. of ice cold water. The resulting suspension is extracted with ether, the ether solution is dried over anhydrous magnesium sulfate, filtered, and the ether is removed by distillation under reduced pressure. The residue is 3.01 grams of 20-spirox-4,6-dien-3-one, which has a melting point of 103° to 105° C.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 17α-(3′-hydroxypropyl)-5-androstene-3β,17β-diol which comprises the steps of reacting a solution of dehydroepiandrosterone tetrahydropyranyl ether in an inert organic solvent with 3-lithiopropanyl-1,2'-tetrahydropyranyl ether to provide 17α-(3'-hydroxypropyl-5-androstene-3β,17β-diol di-tetrahydropyranyl ether and heating a solution of the latter compound in an inert organic solvent with para-toluenesulfonic acid.

2. A process according to claim 1 in which the reaction of dehydroepiandrosterone tetrahydropyranyl ether with 3-lithiopropanyl-1,2'-tetrahydropyranyl ether is conducted in solution in ether and tetrahydrofuran at a temperature below 30° C.

3. A process according to claim 1 in which 17α-(3'-hydroxypropyl)-5-androstene-3β,17β-diol di-tetrahydropyranyl ether is heated in solution in ethanol with para-toluenesulfonic acid.

4. A process for the preparation of 17α-(3'-hydroxypropyl)-5-androstene-3β,17β-diol di - tetrahydropyranyl ether which comprises reacting a solution of dehydroepiandrosterone tetrahydropyranyl ether in an inert organic solvent with 3-lithiopropanyl-1,2'-tetrahydropyranyl ether.

5. A process according to claim 4 in which the solvent is ether and tetrahydrofuran and the reaction is conducted at a temperature of below 30° C.

6. A process for the preparation of 17α-(3'-hydroxypropyl)-5-androstene-3β,17β-diol which comprises heating a solution of 17α-(3'-hydroxypropyl)-5-androstene-3β,17β-diol di-tetrahydropyranyl ether in an inert organic solvent with para-toluenesulfonic acid.

7. A process according to claim 6 in which the inert organic solvent is ethanol.

References Cited

UNITED STATES PATENTS 3,352,853   11/1967   Klimstra.

H. A. FRENCH, *Primary Examiner.*

U.S. Cl. X.R.

260—397.5; 167—74